United States Patent
Tochiyama

[19]

[11] Patent Number: 5,964,027
[45] Date of Patent: Oct. 12, 1999

[54] METHOD OF MANUFACTURING SPINDLE MOTOR FOR DISK STORAGE DEVICE

[75] Inventor: Kazunori Tochiyama, Mirage Tower, Singapore

[73] Assignee: Fujitsu Limited, Kawasaki, Japan

[21] Appl. No.: 08/928,377

[22] Filed: Sep. 12, 1997

[30] Foreign Application Priority Data

Mar. 18, 1997 [JP] Japan ..................................... 9-064540

[51] Int. Cl.⁶ .............................. H02K 7/08; B24B 1/00
[52] U.S. Cl. ..................... 29/596; 29/603.01; 29/603.03; 29/603.04; 29/898.02; 451/49; 360/98.07
[58] Field of Search .............................. 360/98.07, 98.08; 29/603.01, 603.03, 603.04, 898.02, 898.07, 596, 598, 604; 451/51, 49

[56] References Cited

U.S. PATENT DOCUMENTS

| | | | |
|---|---|---|---|
| 2,511,934 | 6/1950 | Meyer | 451/51 |
| 3,684,841 | 8/1972 | Boehme | 179/100 |
| 3,842,544 | 10/1974 | Paola | 51/129 |
| 4,667,446 | 5/1987 | Imahashi | 51/229 |
| 4,941,293 | 7/1990 | Ekhoff | 451/342 |
| 5,099,614 | 3/1992 | Arai et al. | 51/165 R |
| 5,142,173 | 8/1992 | Konno et al. | 360/98.07 |
| 5,167,096 | 12/1992 | Eltoukhy et al. | 451/59 |
| 5,449,313 | 9/1995 | Kordonsky et al. | 451/35 |
| 5,471,732 | 12/1995 | Yumiki et al. | 29/898.07 |
| 5,482,497 | 1/1996 | Gonnella et al. | 451/57 |
| 5,609,657 | 3/1997 | Ishitobi | 51/309 |
| 5,763,967 | 6/1998 | Kurosawa et al. | 360/98.07 |

Primary Examiner—Lee W. Young
Assistant Examiner—A. Dexter Tugbang
Attorney, Agent, or Firm—Greer, Burns & Crain Ltd.

[57] ABSTRACT

Disclosed is a method of manufacturing a spindle motor using a fluid bearing. The spindle motor includes a hub having a support member for supporting a disk storage medium and a magnet, a fixed member having a coil, for holding the hub rotatably, and a fluid bearing provided between the hub and the fixed member. In this method, the hub is secured to the fixed member through the fluid bearing. This method includes a step of grinding a support surface of the support member. In this grinding step, a grinding member is applied to a part of the support member, and other part of the support member is pressurized by a pressurizing member to prevent the hub from falling down due to the pressurization by the grinding member.

9 Claims, 16 Drawing Sheets

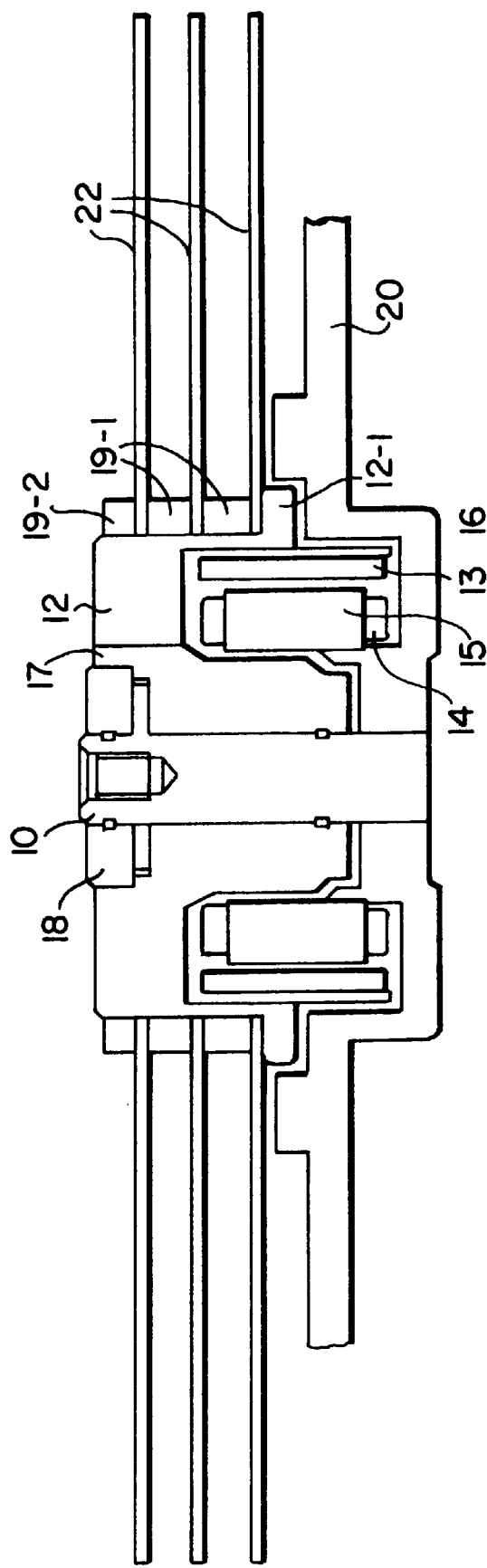

METHOD OF MANUFACTURING SPINDLE MOTOR FOR DISK STORAGE DEVICE

BACKGROUND OF THE INVENTION

1. Field of the Invention

The present invention relates generally to a method of manufacturing a spindle motor for rotating a disk storage medium and, more particularly, to a method of manufacturing a spindle motor for enhancing a rotational precision of the disk storage medium.

2. Description of the Related Art

Over the recent years, an increase in storage density has been demanded of a disk storage device. For increasing this storage density, a magnetic disk apparatus is required to have a higher track density on a magnetic disk. When increasing the track density on the disk medium, however, rotational shaking of the disk medium exerts an influence on a positioning accuracy of a head. This being the case, a spindle motor demanded is the one causing a lesser quantity of rotational shaking of the magnetic disk medium.

FIG. 14 is an explanatory diagram illustrating a magnetic disk apparatus.

As shown in FIG. 14, a plurality of magnetic disks 2 are supported on a spindle motor 1. The spindle motor 1 rotates a magnetic disk 2. A magnetic head 4 is provided for reading and writing data from and to the magnetic disk 2. An actuator 3 positions the magnetic head 4 on a track on the magnetic disk 2.

In the magnetic disk apparatus, as known well, the actuator 3 positions the magnetic head 4 on a desired track on the magnetic disk 2. Then, the magnetic head 4 reads or writes the data from or to the same track.

FIG. 15 is a sectional view showing a prior art spindle motor.

A lower end of a fixed shaft 82 is secured to a base 81 of the magnetic disk apparatus. The base 81 is provided with a core 89 on which a coil 88 is wound.

A sleeve 83 is fitted to the fixed shaft 82 through a pair of ball bearings 85. The sleeve 83 is rotatable with respect to the fixed shaft 82. A hub 84 is fixed to its periphery of the sleeve 83. The hub 84 has a support member 84-1 for the magnetic disk. An upper surface of the disk support member 84-1 of the hub 84 serves as a support surface for the magnetic disk. A yoke 87 and a magnet 86 are fixed to an internal surface of the hub 84.

In this spindle motor, the magnet 86 fixed to the hub 84 is disposed in a face-to-face relationship with the coil 88 fixed to the base 81. Therefore, when flowing an electric current across the coil 88, the hub 84 rotates.

FIGS. 16A and 16B are explanatory views each showing an assembling method in the prior art.

As illustrated in FIG. 16A, the fixed shaft 82 is secured to the base 81 fitted with the coil 88. Then, the sleeve 83 and the hub 84 are attached to the fixed shaft 82 through the ball bearings 85.

Thereafter, a cutting blade 90 is pressurized upon one area of the upper surface (the support surface of the magnetic disk) of the disk support member 84-1 of the hub 84. Then, the disk support surface of the disk support member 84-1 is ground by the cutting blade 90 while rotating the hub 84.

Next, as illustrated in FIG. 16B, the magnetic disk 2 is mounted on the hub 84. At this time, the magnetic disk 2 is supported by the disk support member 84-1 of the hub 84. Then, a position of the magnetic disk 2 from the base 81 is determined by a position of the support surface of the disk support member 84-1. Note that the numeral 91 designates a spacer for taking a spacing between the magnetic disks 2, and the numeral 92 represents a cap for fixing the magnetic disk 2.

After a step shown in FIG. 16B, the actuator 3 including the magnetic head 4 is secured to the base 81. A position of the magnetic head 4 is based on a position of the surface of the magnetic disk 2. It is therefore required that a height of the magnetic disk 2 from the base 81 be set as precise as a micron order.

Incidentally, an assembly error is to be caused in the assembly of the spindle motor shown in FIG. 16A. If this assembly error is produced, the height of the disk support surface of the disk support member 84-1 from the base 81 differs according to each spindle motor. Therefore, a height of the magnetic disk 2 from the base 81 is also different depending on each spindle motor. A floating quantity of the magnetic head from the magnetic disk surface is thereby varied, which might influence read/write characteristics of the magnetic head.

The height of the magnetic disk 2 from the base 81 is fixed by each spindle motor, and hence, as shown in FIG. 16A, the disk support surface of the disk support member 84-1 of the hub 84 is ground after assembling the spindle motor.

On the other hand, an enhancement of the track density of the magnetic disk is demanded. When increasing the track density, the rotational shaking of the magnetic disk exerts the influence upon the positioning precision of the magnetic head.

The ball bearing has hitherto been used as a bearing. the ball bearing tends to cause vibrations of inner and outer rings with passages of the balls. Namely, PRO (Repeatable Run Out)/NPRO (Non Repeatable Run Out) occurs, and the rotational shaking of the spindle motor is therefore inevitable.

For preventing this rotational shaking, it is examined that a fluid bearing is used as a bearing. The fluid bearing, when rotating, comes to have a pressure produced. Subsequently, the fluid bearing keeps itself afloat in the axial direction till the gravity, a magnetic force and an external pressure balance with each other. Self-aligning action works in the radial direction. With this action, it is feasible to provide rotations through a fluid lubrication with a reduced friction between the shaft 82 and the sleeve 83. When using this fluid bearing, non-contact rotations can be actualized, which enables the rotational shaking of the spindle motor to decrease.

By the way, according to the prior art grinding method described referring to FIG. 16A, one point on the hub 84 is pressurized. The spindle motor using the conventional ball bearings is high of a rigidity of the ball bearing, and therefore no inclination of the hub 84 is produced. For this reason, the disk support surface of the disk support member 84-1 can be ground flat.

The fluid bearing has, however, a rigidity that is by far smaller than in the ball bearing. Therefore, when executing the grinding process with the conventional one-point pressurization in the prior art, the hub is inclined, and the disk support surface of the disk support member is ground unflat.

Such being the case, when mounting the magnetic disk, the magnetic disk mounted never becomes flat. The mounted magnetic disk thereby comes to have a difference in height from the base between the inner side and the outer side. Accordingly, the floating quantity of the magnetic head changes on the inner and outer sides of the magnetic disk.

This leads to such a problem that the read/write characteristics of the magnetic head change on the inner and outer sides of the magnetic disk.

SUMMARY OF THE INVENTION

It is a primary object of the present invention to provide a method of manufacturing a spindle motor for a disk storage device, which is contrived to reduce rotational shaking of a disk storage medium by use of fluid bearing.

It is another object of the present invention to provide a method of manufacturing a spindle motor of a disk storage device, which is capable of working flat a disk support surface of a hub even by using a fluid bearing.

It is still another object of the present invention to provide a method of manufacturing a spindle motor of a disk storage device, which is capable of supporting flat a disk storage medium even by using a fluid bearing.

A spindle motor for a disk storage device according to the present invention includes a hub having a support member for supporting a disk storage medium and a magnet, a fixed portion, having a coil, for supporting said hub in a rotatable manner, and a fluid bearing provided between the hub and the fixed portion.

Then, a manufacturing method thereof comprises a step of securing the hub to the fixed portion through a fluid bearing, and a step of next grinding a support surface of the support member while rotating the hub. This grinding step is a step of applying a cutting member to a part of the support member and also pressuring other part of the support member with a pressurizing member so as to prevent the hub from falling down (tilting) due to the pressurization by the cutting member.

According to the present invention, a plurality of pressurizing positions of the support member of the hub are prepared in the grinding step. Namely, if only pressurized by the cutting member, the grinding process is implemented in a state where the hub falls down (is tilted). For preventing the hub from falling down, the pressurizing member pressurizes other positions of the support member of the hub.

With this arrangement, the disk support surface can be ground flat even by using the fluid bearing having a small rigidity as a bearing of the hub on the occasion of grinding the disk support surface of the disk support member of the hub. Therefore, the disk medium can be supported flat on the hub even by use of the fluid bearing having a small quantity of rotational shaking. Accordingly, it is feasible to prevent the rotational shaking of the disk storage medium and enhance the positional accuracy of the disk storage medium.

Other features and advantages of the present invention will become readily apparent from the following description taken in conjunction with the accompanying drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principle of the invention, in which:

FIG. 7 is an explanatory view showing a disk mounting process in the first embodiment of the present invention;

DETAILED DESCRIPTION OF THE PREFERRED EMBODIMENTS

Figure 1:
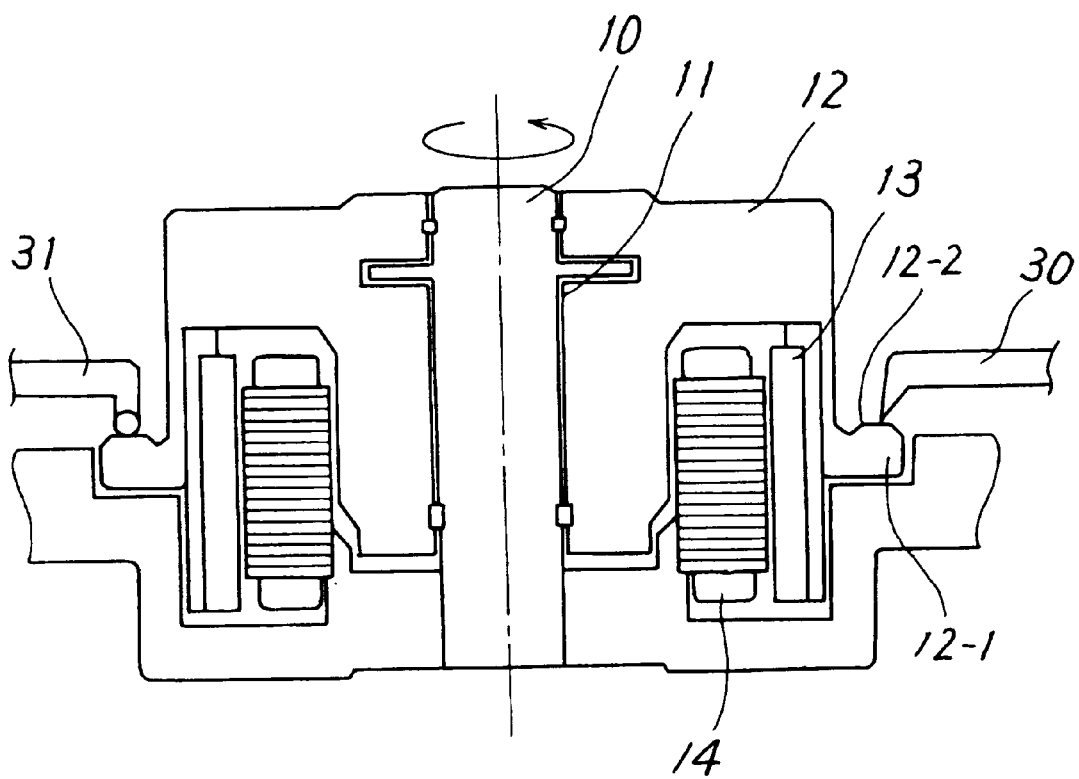
FIG. 1 is a view showing the principle of the present invention.

FIG. 1 is a view showing the principle of the present invention.

A spindle motor of a disk storage device includes a hub 12 having a support member 12-1 for supporting a disk storage medium, and a magnet 13. A fixed portion 10 has a coil 14 and supports the hub 12 in a rotatable manner. A fluid bearing 11 is provided between the hub 12 and the fixed portion 10.

Then, a manufacturing method thereof is explained as follows. The hub 12 is secured to the fixed portion 10 through the fluid bearing 11. Next, a support surface 12-2 of the support member 12-1 is ground while rotating the hub 12.

In this grinding process, a grinding member 30 is applied to a part of the support member 12-1. With this process, other portion of the support member 12-1 is pressurized by a pressurizing member 31 to prevent the hub 12 from falling down (tilting) due to the pressurization by the grinding member 30.

According to the present invention, a plurality of pressurizing positions of the support member 12-1 of the hub 12 are provided in the grinding process. Namely, if only pressurized by the grinding member 30, it follows that the grinding process is executed in an as-fallen state of the hub 12. For preventing the hub 12 from falling down (tilting), other position of the support member 12-1 of the hub 12 is pressurized by the pressurizing member 31.

The disk support surface can be thereby ground flat on the occasion of grinding the disk support surface 12-2 of the disk support member 12-1 of the hub 12 even in such a case that the bearing of the hub 12 involves the use of the fluid bearing 11. Therefore, the hub 12 is capable of supporting the disk medium flat even by using the fluid bearing with a less quantity of rotational shaking as the bearing of the hub 12. Accordingly, it is possible to prevent the rotational shaking of the disk storage medium and to enhance the positional accuracy of the disk storage medium.

Figure 2:
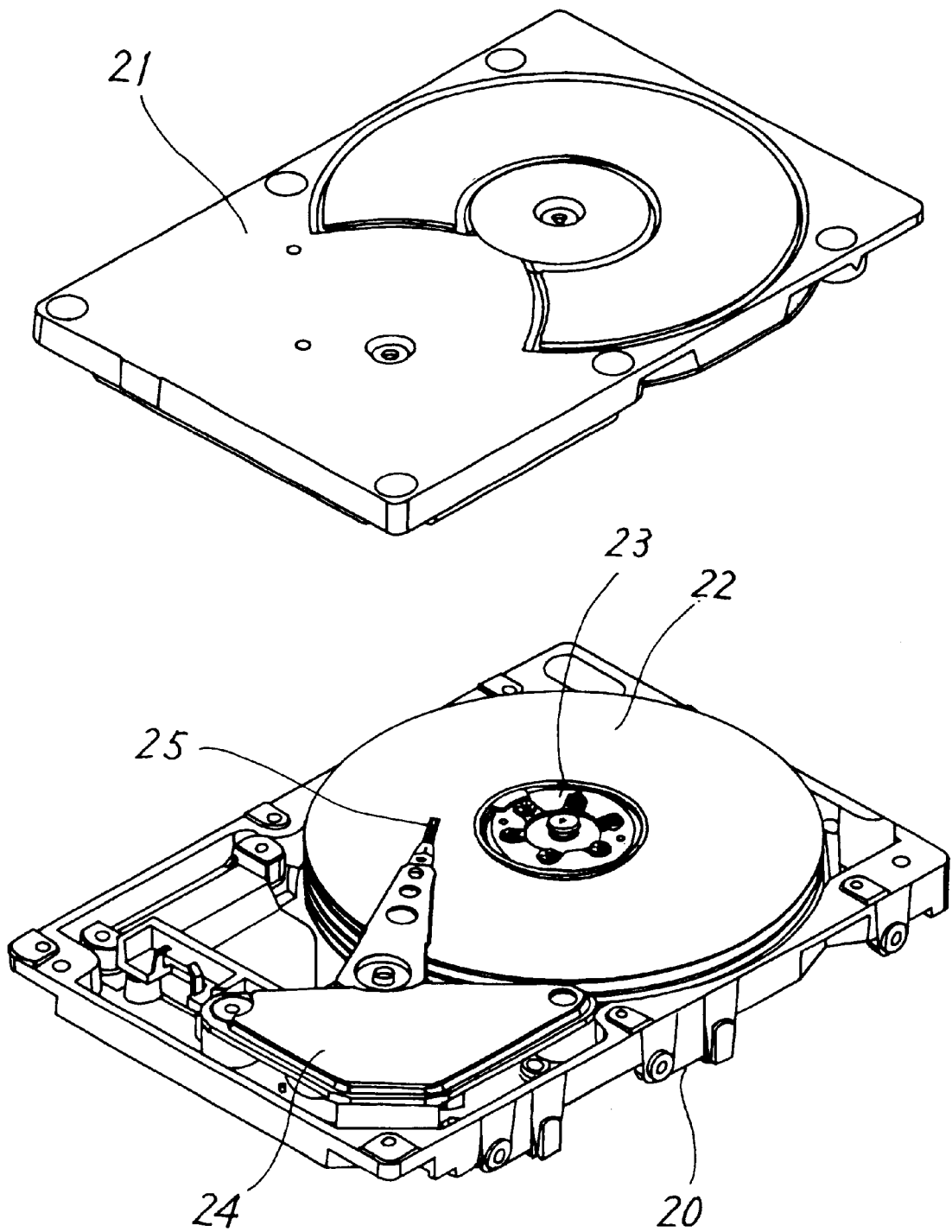
FIG. 2 is a perspective view illustrating a magnetic disk apparatus in a first embodiment of the present invention.
Figure 3:
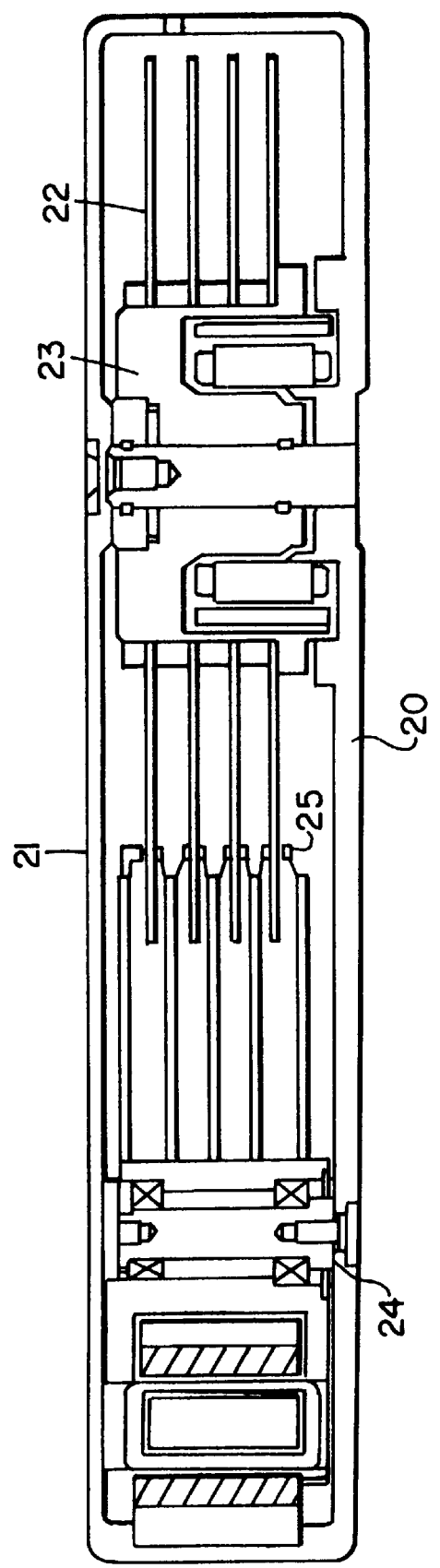
FIG. 3 is a sectional view showing the magnetic disk apparatus in the first embodiment in FIG. 2.

FIG. 2 is a perspective view of the magnetic disk apparatus in one embodiment of the present invention. FIG. 3 is a sectional view of the magnetic disk apparatus in one embodiment of the present invention.

As illustrated in FIGS. 2 and 3, a base 20 is provided with a spindle motor 23. The spindle motor 23 is mounted with a plurality of magnetic disks 22. The spindle motor 23 rotates the magnetic disk 22. The base 20 is provided with an rotary actuator 24. A magnetic head 25 is secured to a tip of the rotary actuator 24.

The rotary actuator 24 locates the magnetic head 25 on a track of the magnetic disk 22. The magnetic head 25 reads and writes data from and to the track of the magnetic disk 22. A cover 21 is provided above the base 20 to cover the magnetic disk 22 and the rotary actuator 24.

Figure 4:
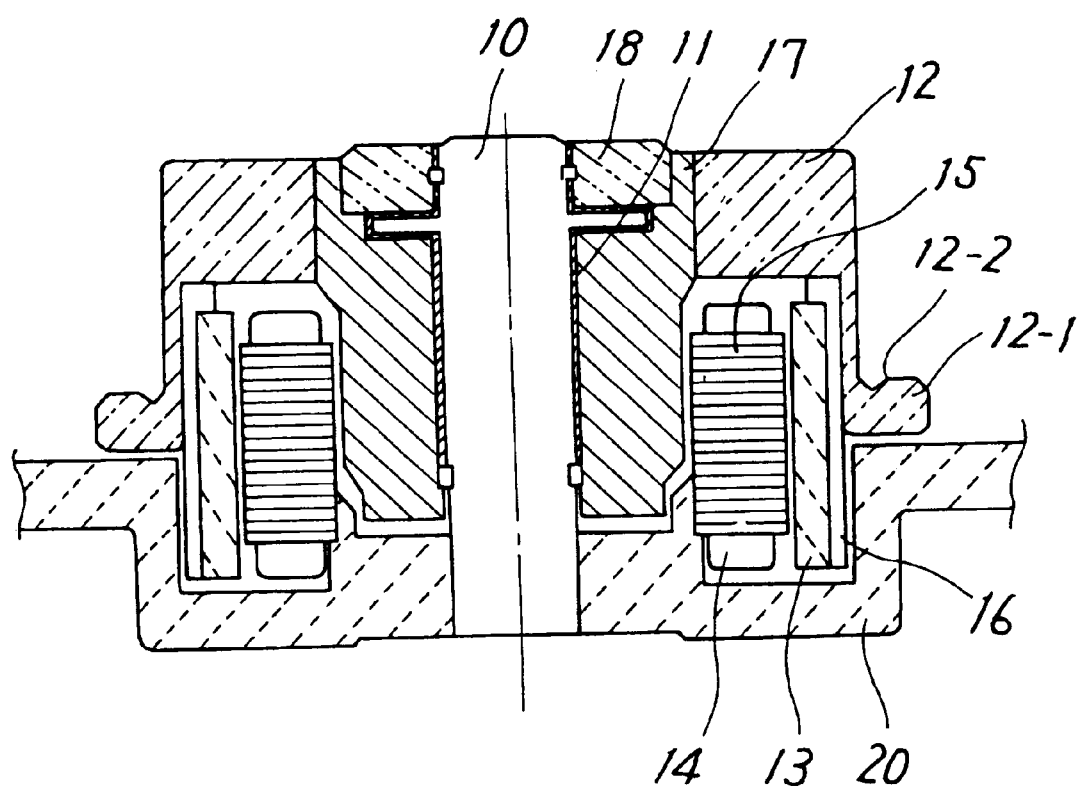
FIG. 4 is a sectional view showing a spindle motor in the first embodiment in FIG. 2.
Figure 5:
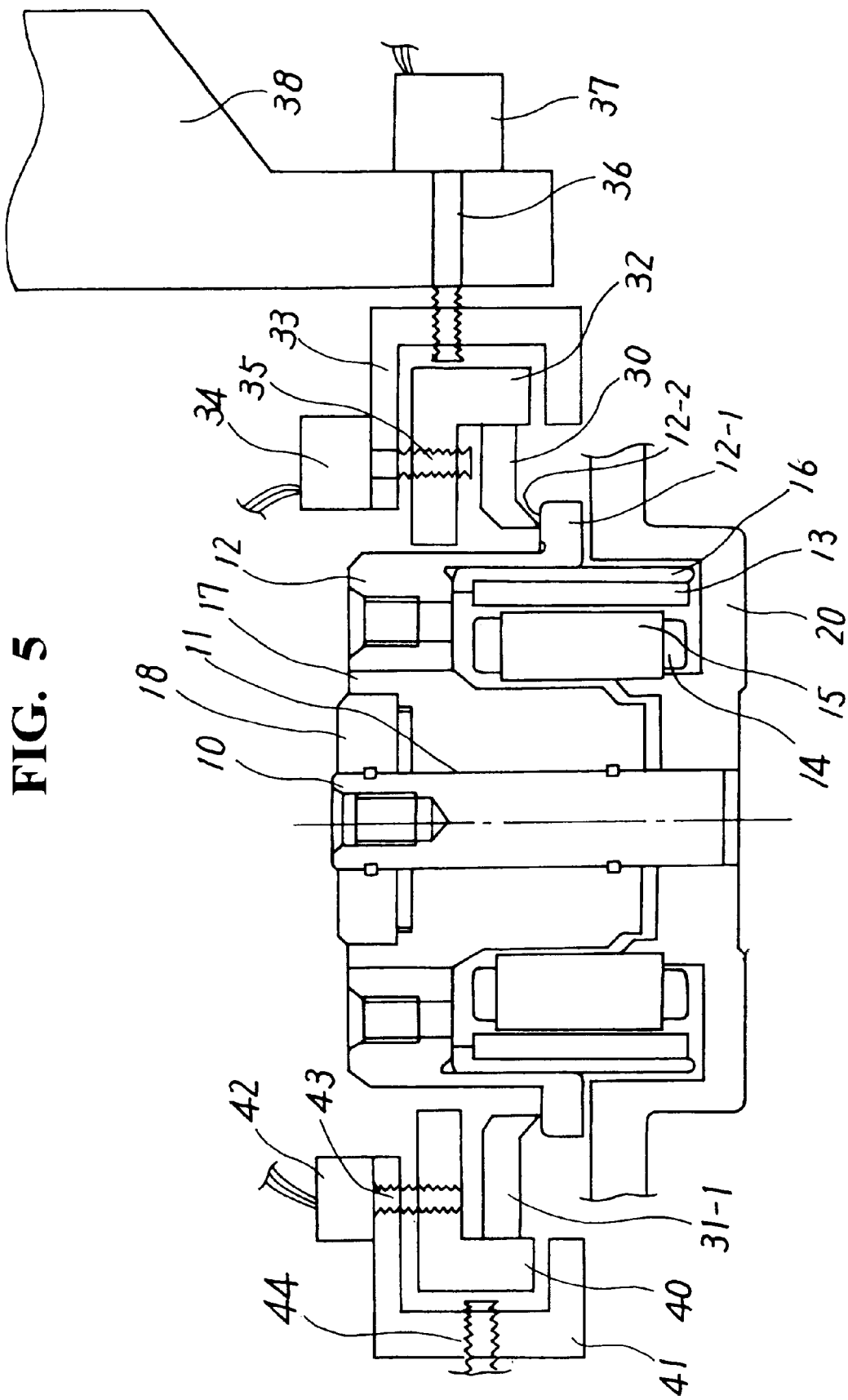
FIG. 5 is an explanatory view showing a grinding process in the first embodiment of the present invention.
Figure 6:
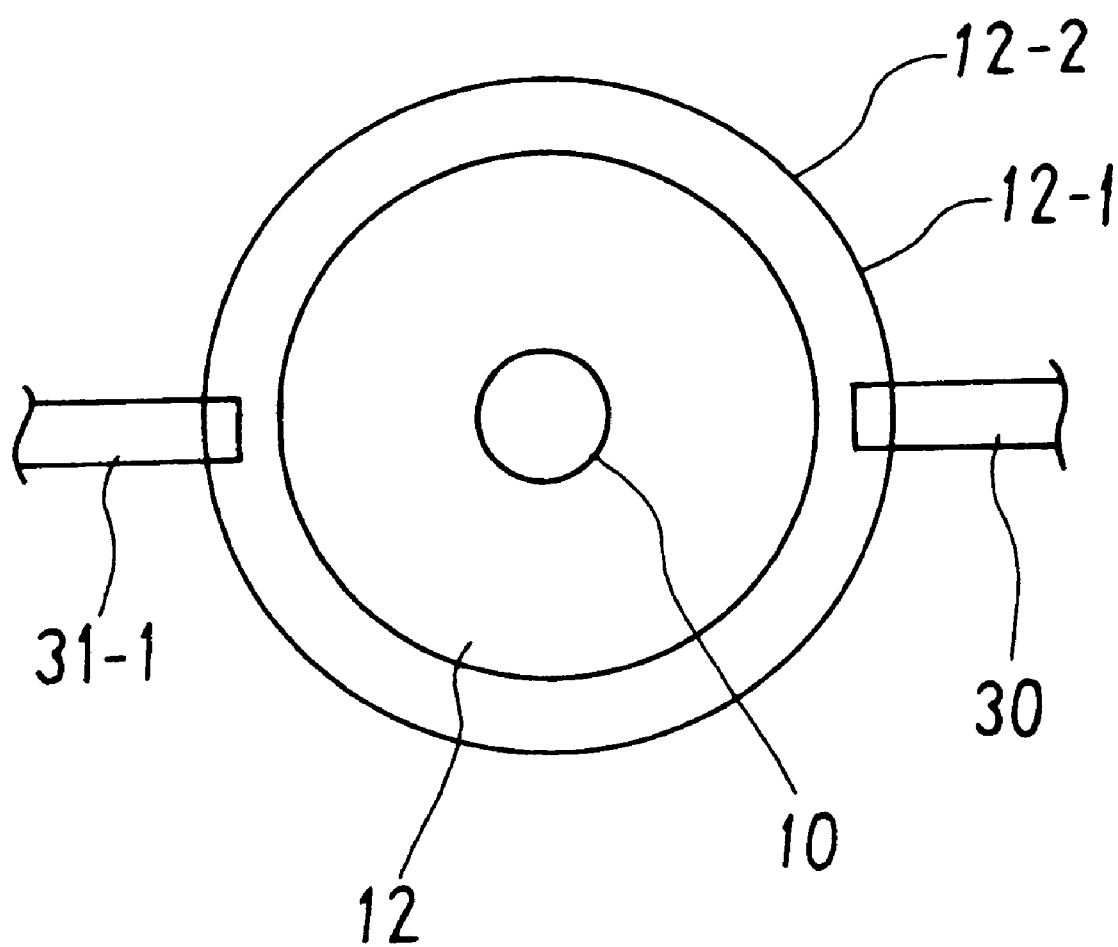
FIG. 6 is a top view when in the grinding process in FIG. 5.
Figure 8A:
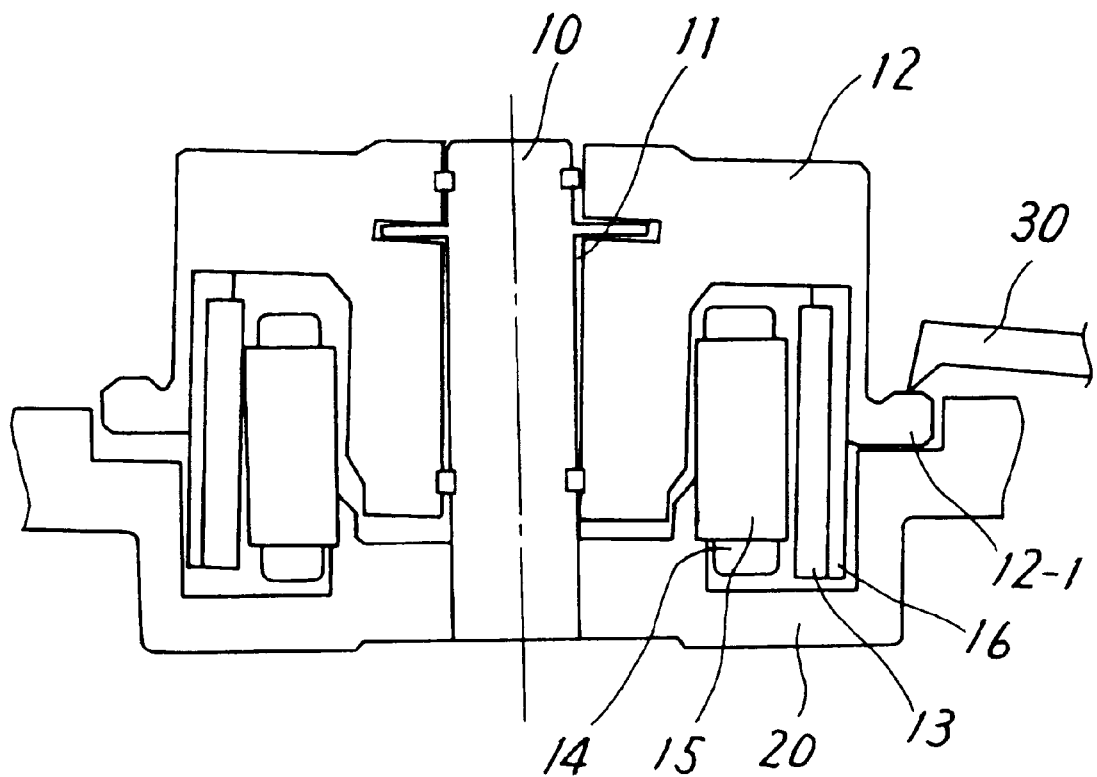
FIGS. 8A and 8B are explanatory views showing comparative examples of the present invention.
Figure 8B:
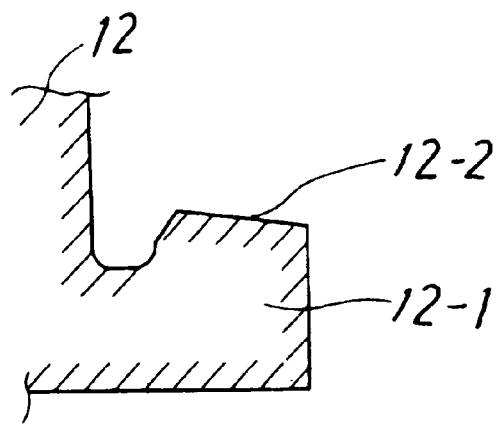
Figure 9:
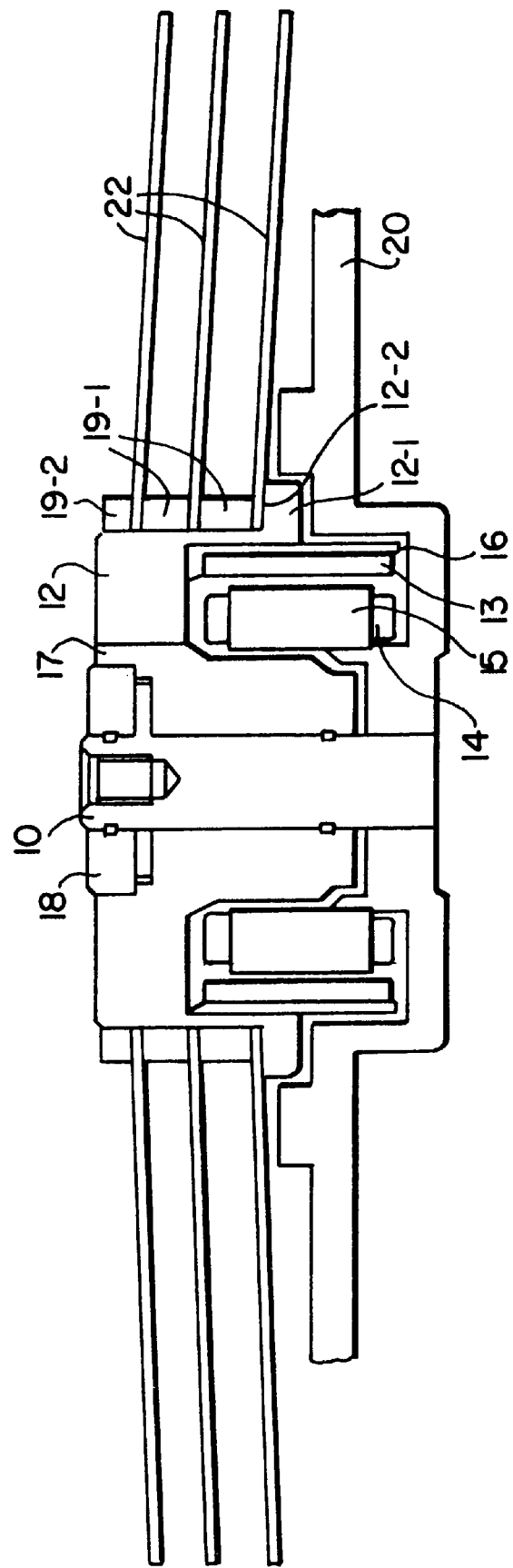
FIG. 9 is an explanatory view showing a comparative example of the present invention when the magnetic disk is mounted.

FIG. 4 is a sectional view illustrating the spindle motor shown in FIGS. 2 and 3. FIG. 5 is an explanatory view showing the grinding process in one embodiment of the present invention. FIG. 6 is a top view when in the grinding process in FIG. 5. FIG. 7 is an explanatory view showing a disk mounting process in one embodiment of the present invention. FIG. 8A and 8B are an explanatory view showing a comparative example of the present invention. FIG. 9 is an explanatory view when mounting the magnetic disk in the comparative example of the present invention.

As illustrated in FIG. 4, a lower end of the fixed shaft 10 is secured to the base 20 of the magnetic disk apparatus. The base 20 is provided with a core 15 on which the coil 14 is wound.

A sleeve 17 is fitted to the fixed shaft 10 through the fluid bearing 11. The sleeve 17 is rotatable with respect to the fixed shaft 10. The hub 12 is fixed to its periphery of the sleeve 17. The hub 12 has the support member 12-1 for the magnetic disk 22. An upper surface 12-2 of the disk support member 12-1 of the hub 12 serves as a support surface for the magnetic disk. A yoke 16 and a magnet 13 are fixed to an internal surface of the hub 12. Note that the numeral 18 represents a cap for holding the sleeve 17.

In this spindle motor, the magnet 13 fixed to the hub 12 is disposed in a face-to-face relationship with the coil 14 fixed to the base 20. Therefore, when flowing an electric current across the coil 14, the hub 12 rotates.

The fluid bearing 11, when rotating, comes to have a pressure produced. Then, the fluid bearing 11 keeps itself afloat in the axial direction till the gravity, a magnetic force and an external pressure balance with each other. Self-aligning action works in the radial direction. With this action, it is feasible to provide rotations through a fluid lubrication with reducing friction between the shaft 10 and the sleeve 17. When using this fluid bearing 11, non-contact rotations can be actualized, which enables the rotational shaking of the spindle motor to decrease.

This spindle motor is assembled in the manner which follows. The fixed shaft 10 is secured to the base fitted with the coil 14. The fixed shaft 10 is provided with the fluid bearing 11. The sleeve 17 to which the hub 12 is attached is fitted to the fixed shaft 10. Further, the cap 18 is fitted into the sleeve 17.

After the spindle motor has been thus assembled, a grinding process shown in FIGS. 5 and 6 is to be executed.

As illustrated in FIG. 5, a cutting blade 30 of a grinder is fixed to a cutting blade support block 32. The cutting blade support block 32 engages with a feed screw 35. The feed screw 35 is rotated by a motor 34. Accordingly, with rotations of the motor 34, the cutting blade 30 moves in up-and-down directions in the Figure.

The motor 34 is supported on the motor support block 33. The motor support block 33 engages with a feed screw 36. The feed screw 36 is rotated by a motor 37. Accordingly, with rotations of the motor 37, the cutting blade 30 moves in right-and-left directions. Motor 37 is supported on an arm 38 of the grinder.

Hence, the cutting blade 30 pressurizes one area on an upper surface (a support surface for the magnetic disk) 12-2 of the disk support member 12-1 of the hub 12.

As illustrated in FIG. 6, a second cutting blade (a pressurizing member) 31-1 is provided in a position rotated through 180 degrees from a position of the cutting blade 30 in the peripheral direction of the hub 12. The second cutting blade 31-1 is fixed to a cutting blade support block 40. The cutting blade support block 40 engages with a feed screw 43. The feed screw 43 is rotated by a motor 42. Accordingly, with rotations of the motor 42, the second cutting blade 31-1 moves in the up-and-down directions in the Figure.

The motor 42 is supported on a motor support block 41. The motor support block 41 engages with a feed screw 44. The feed screw 44 is rotated by an unillustrated motor. Accordingly, rotations of this motor cause the second cutting blade 31-1 to move in the right-and-left directions in the Figure. This unillustrated motor is supported on the arm of the unillustrated grinder.

Therefore, the second cutting blade 31-1 pressurizes other area on the upper surface (the support surface for the magnetic disk) 12-2 of the disk support member 12-1 of the hub 12.

Next, the electric current flows across the coil 14 of the spindle motor, thereby rotating the hub 12. The disk support surface 12-2 of the disk support member 12-1 of the hub 12 is thereby grounded by the cutting blade 30.

At this moment, as shown in FIG. 6, the first cutting blade 30 pressurizes a first position on the disk support surface 12-2 of the hub 12. Simultaneously, the second cutting blade 31-1 pressurizes a second position deviating 180 degrees from the first position. Therefore, the hub 12 is equally pressurized. Accordingly, the hub 12 can be prevented from falling down when pressurized. This enables the disk support surface 12-2 of the disk support member 12-1 of the hub 12 to be grounded flat.

Further, in addition to cutting by the first cutting blade 30, the second cutting blade 31-1 also cuts the disk support surface 12-2 of the disk support member 12-1 of the hub 12, whereby a grinding time can be reduced.

A cutting quantity is determined by feeding quantities by the motors 35, 42. The fluid bearing 11 is low of its rigidity thereof as explained above, and hence the hub 12 sinks downward in the Figure with respect to the fixed shaft 11 upon the pressurization by the cutting blades 30, 31-1. A moving quantity produced by the above pressurization is to be calculated beforehand. Then, the feeding quantities are incremented corresponding to the thus calculated moving quantity.

Even when the spindle motor using the fluid bearing 11 exhibiting the small rigidity is worked by pressurization, the disk support surface of the disk support member 12-1 of the hub 12 can be thereby ground to a height as specified.

Next, as illustrated in FIG. 7, the magnetic disk 22 is mounted on the hub 12, at which time the magnetic disk 22 is supported on the disk support surface 12-2 of the disk support member 12-1 of the hub 12. Note that the numeral 19-1 designates a spacer for taking a spacing between the magnetic disks 22, and the numeral 19-2 represents a cap for fixing the magnetic disks 22.

After this process, an actuator 24 including a magnetic head 25 is secured to the base 20.

As the disk support surface 12-2 of the disk support member 12-1 of the hub 12 is ground flat, the magnetic disk 22 is mounted flat. Further, the disk support surface 12-2 of the disk support member 12-1 of the hub 12 is ground to the specified height with respect to the base 20, and therefore a height of the magnetic disk 22 is also fixed in each magnetic disk apparatus.

With this arrangement, a distance between each arm of the rotary actuator 24 and the magnetic disk 22 is fixed. Accordingly, a floating quantity of the magnetic head secured to the arm becomes fixed, whereby a decline of the read/write characteristics can be prevented.

Contrastingly, as illustrated in FIG. 8A, when the disk support surface 12-2 of the disk support member 12-1 of the hub 12 is pressurized by only the cutting blade 30 for the cutting process, the hub 12 tends to slant by dint of the pressure of the cutting blade 30. If the disk support surface 12-2 of the disk support member 12-1 of the hub 12 is ground in this slant state, as shown in FIG. 8B, the disk support surface 12-2 of the disk support member 12-1 is worked obliquely.

Then, if the magnetic disk 22 is mounted on this obliquely-formed disk support surface 12-2, as shown in FIG. 9, it follows that magnetic disk 22 is also mounted on the skew. More specifically, the magnetic disk 22 is mounted in an umbrella-like shape.

Therefore, according to the prior art one-position pressurizing method, the distance between the magnetic disk 22 and the arm differs according to an outer position and an inner position of the magnetic disk 22. Consequently, the floating quantity of the magnetic head differs according to the outer position and the inner position of the magnetic disk 22. Hence, the read/write characteristics of the magnetic head are different depending on the outer position and the inner position. Namely, the read/write characteristics of the magnetic head decline.

Figure 10A:
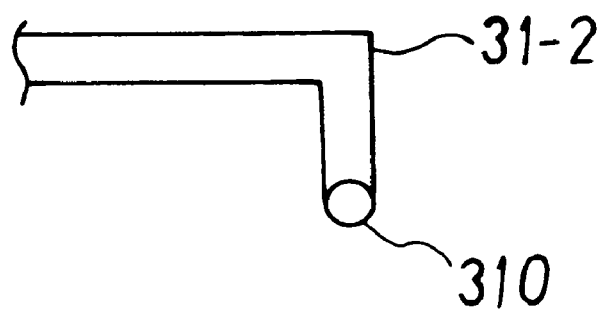
FIGS. 10A and 10B are explanatory views showing other pressurizing members in a second embodiment of the present invention.
Figure 10B:
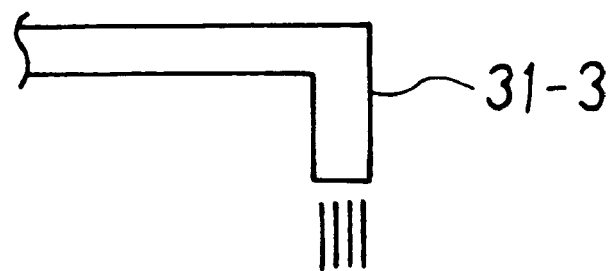

FIGS. 10A and 10B show a second embodiment of the present invention, and are explanatory views of other pressurizing member.

As illustrated in FIG. 10A, the pressurizing member involves the use of a pressurizing bar 31-2 including a ball 310 at its tip. Then, the ball 310 is brought into contact with the disk support surface of the disk support member 12-1, and thus pressurizes the disk support surface. The ball 310 rotates on the disk support surface, and hence, even when pressurizing it, a resistance against the rotations of the hub 12 can be reduced.

Referring to FIG. 10B, the pressurizing member involves the use of a member 31-3 for blowing a gas or a fluid. The disk support surface of the disk support member 12-1 is pressurized by blowing the gas or the fluid. The pressurization can be done in a non-contact manner, and therefore, even when pressurizing it, the rotational resistance of the hub 12 can be decreased.

Further, the gas or the fluid has a function to remove worked powders produced during the grinding process.

furthermore, the gas or the fluid also has a function to restrain a rise in temperature of the hub 12 to be ground.

Figure 11:
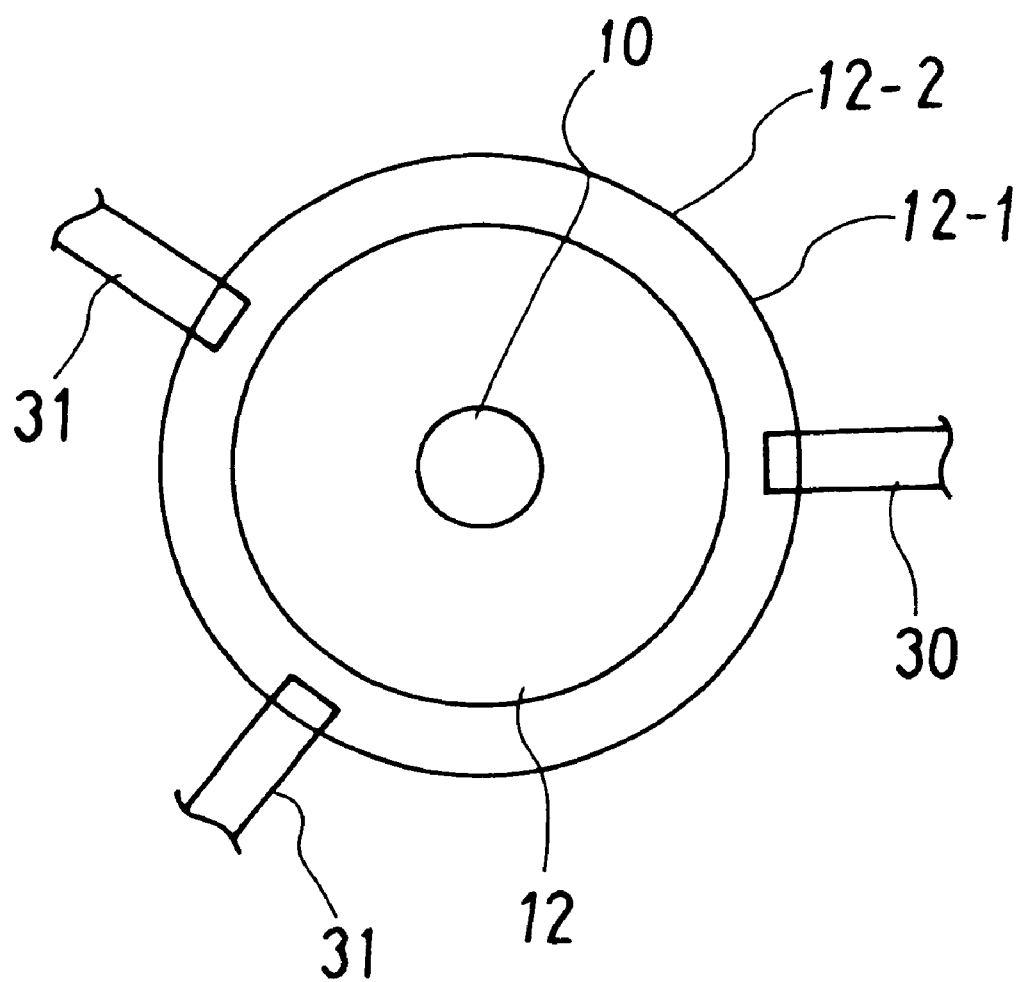
FIG. 11 is an explanatory view showing another pressurizing method in a third embodiment of the present invention.

FIG. 11 is an explanatory view showing another pressurizing method in a third embodiment of the present invention.

FIG. 11 shows an upper surface of the spindle motor when in the grinding process. As shown in FIG. 11, in a first position, the cutting blade 30 pressurizes the disk support surface of the disk support member 12-1 of the hub 12. Corresponding thereto, pressurizing members 31 are provided in other two pressurizing positions. The first pressurizing member 31 is provided in a position rotated through 120 degrees with resect to the cutting blade 30. The second pressurizing member 31 is provided in a position rotated through 240 degrees with resect to the cutting blade 30.

With this arrangement, the hub 12 can be prevented more surely from falling down. As described above, a plurality of pressurizing points may be provided.

Figure 12:
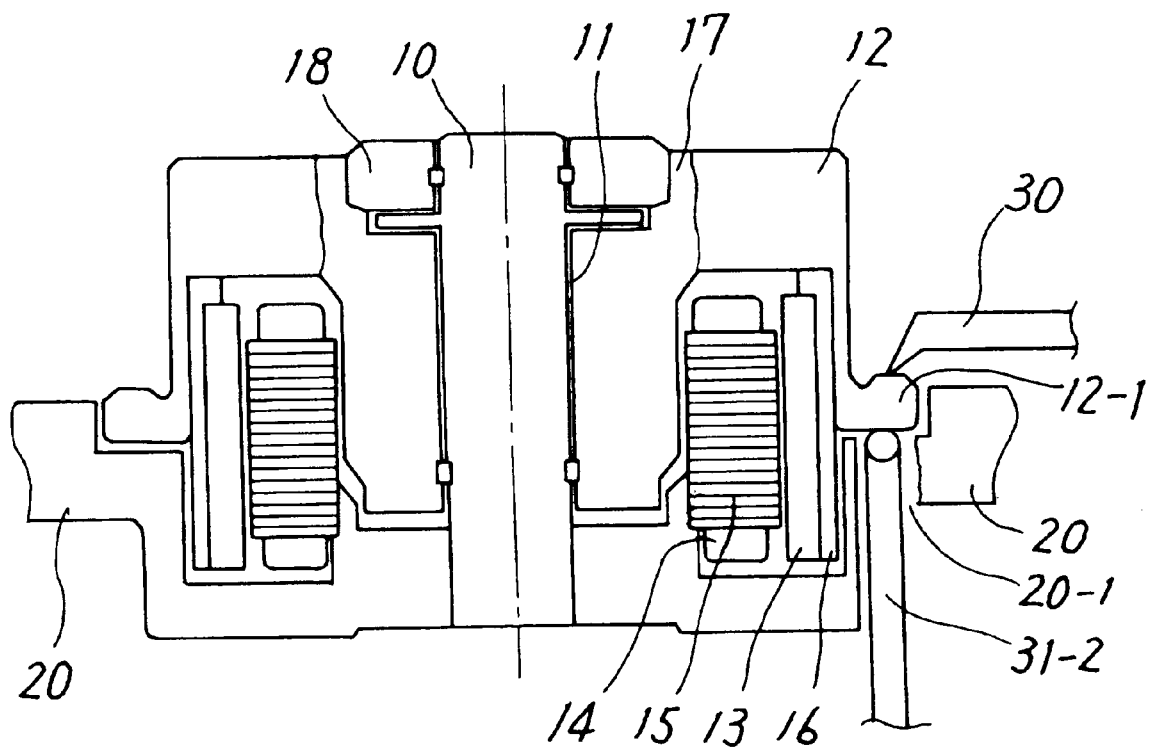
FIG. 12 is an explanatory view showing another grinding method in a fourth embodiment of the present invention.

FIG. 12 is an explanatory view showing still another grinding method in a fourth embodiment of the present invention.

FIG. 12 shows a section of the spindle motor when in the grinding process. As illustrated in FIG. 12, the disk support surface 12-2 of the disk support member 12-1 of the hub 12 is pressurized by the cutting blade 30. The base 20 is formed with a hole 20-1 into which a pressurizing member 31-2 is inserted. Then, the pressurizing member 31-2 pressurizes a surface opposite to the disk support surface 12-2.

This arrangement is also able to prevent the hub 12 from falling down due to the pressurization by the cutting blade 30. In this case, the pressurizing bar 31-2 shown in FIG. 8A or the member 31-3 shown in FIG. 8B for blowing the gas or the fluid, may be preferable as the pressurizing member 31-2.

Figure 13:
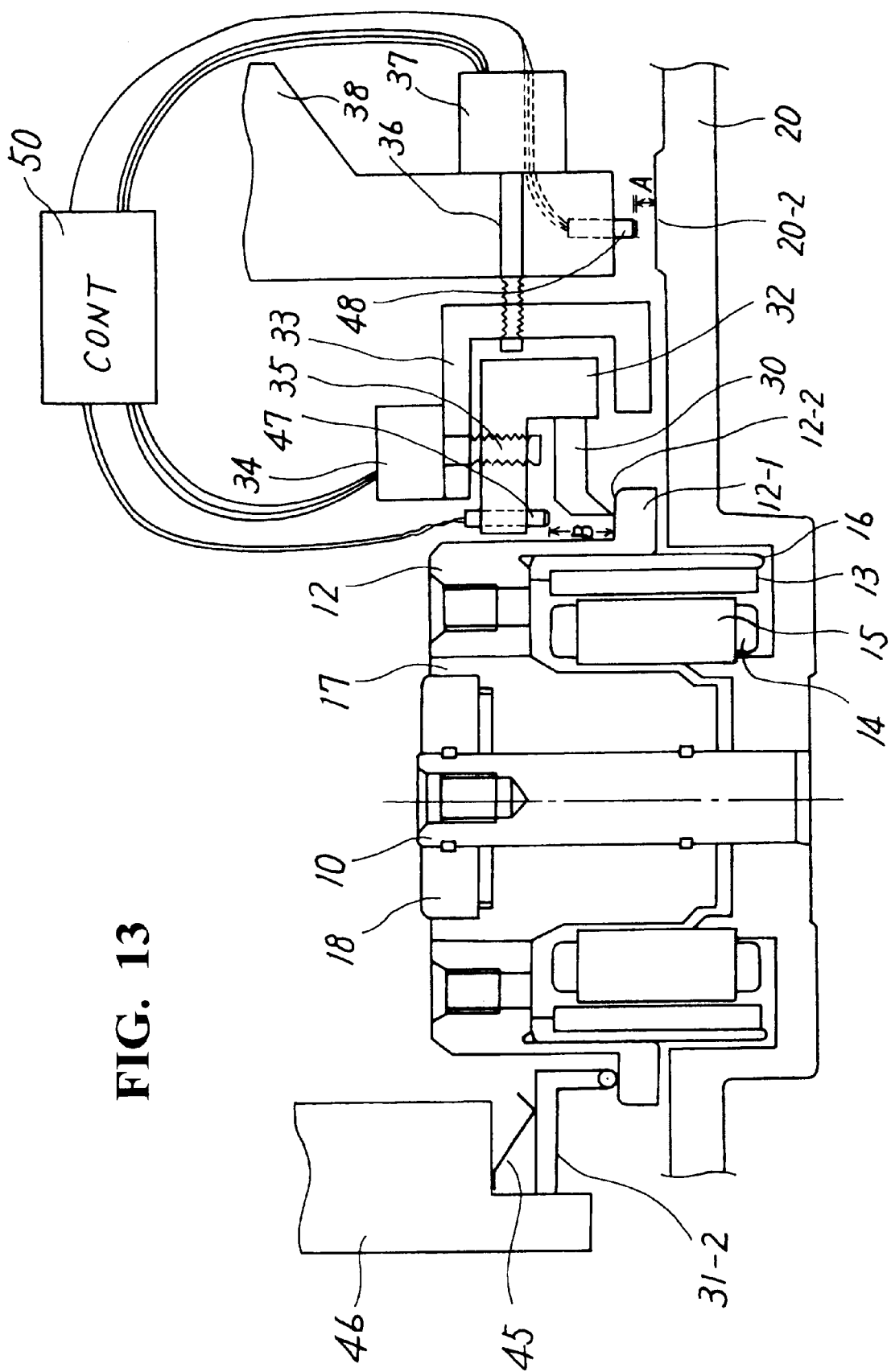
FIG. 13 is an explanatory view showing still another grinding method in a fifth embodiment of the present invention.
Figure 14:
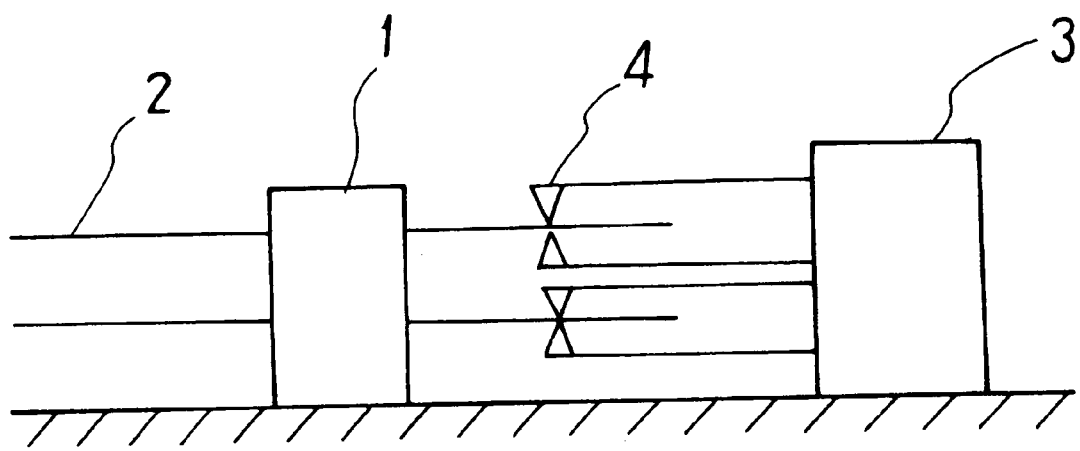
FIG. 14 is an explanatory view illustrating a magnetic disk apparatus.
Figure 15:
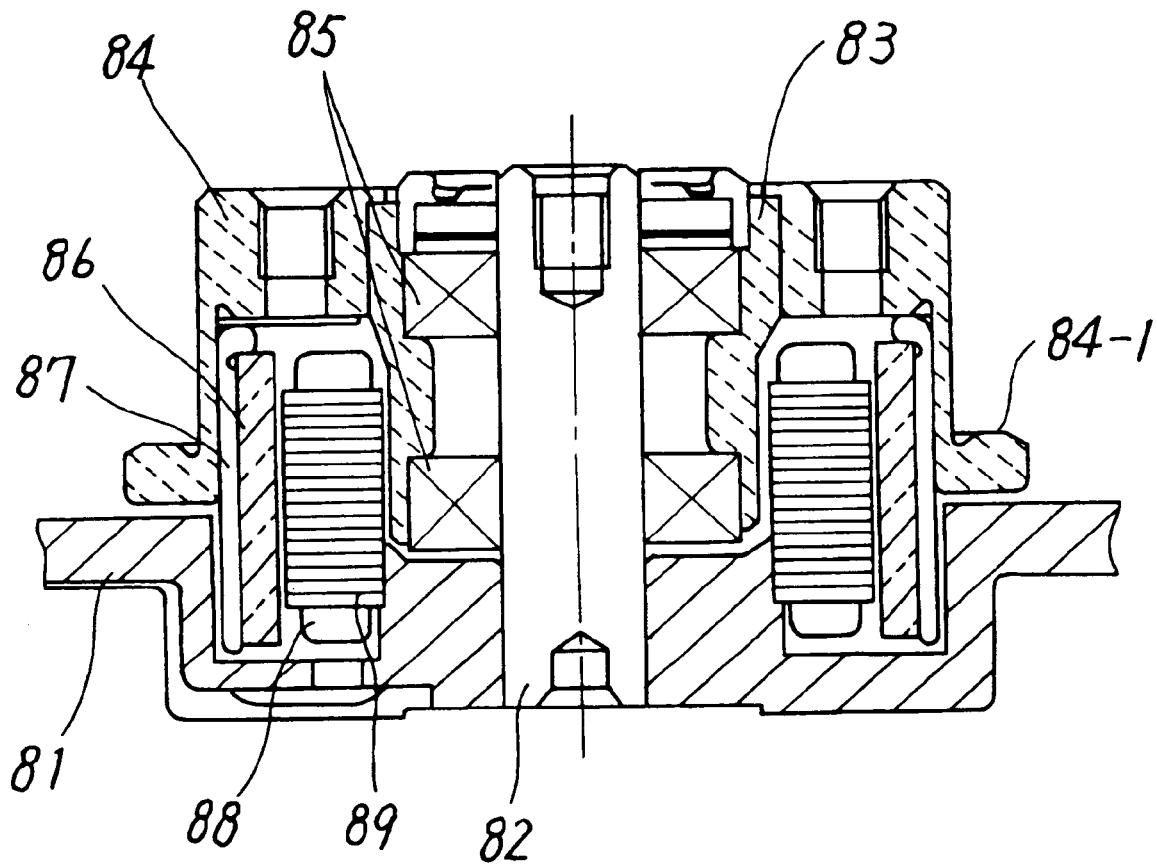
FIG. 15 is a sectional view showing a spindle motor in the prior art.
Figure 16A:
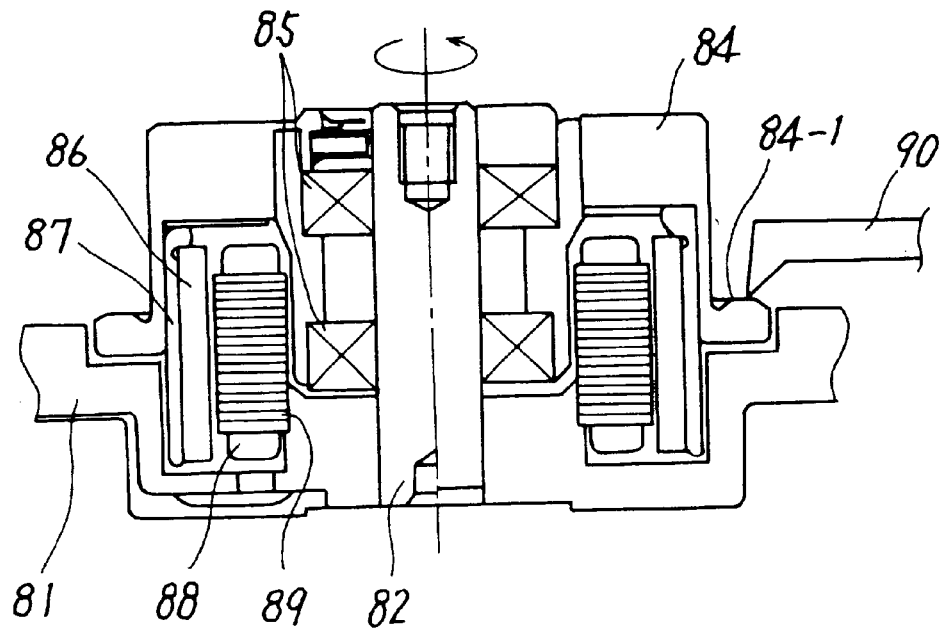
FIGS. 16A and 16B are explanatory views showing an assembling method in the prior art.
Figure 16B:
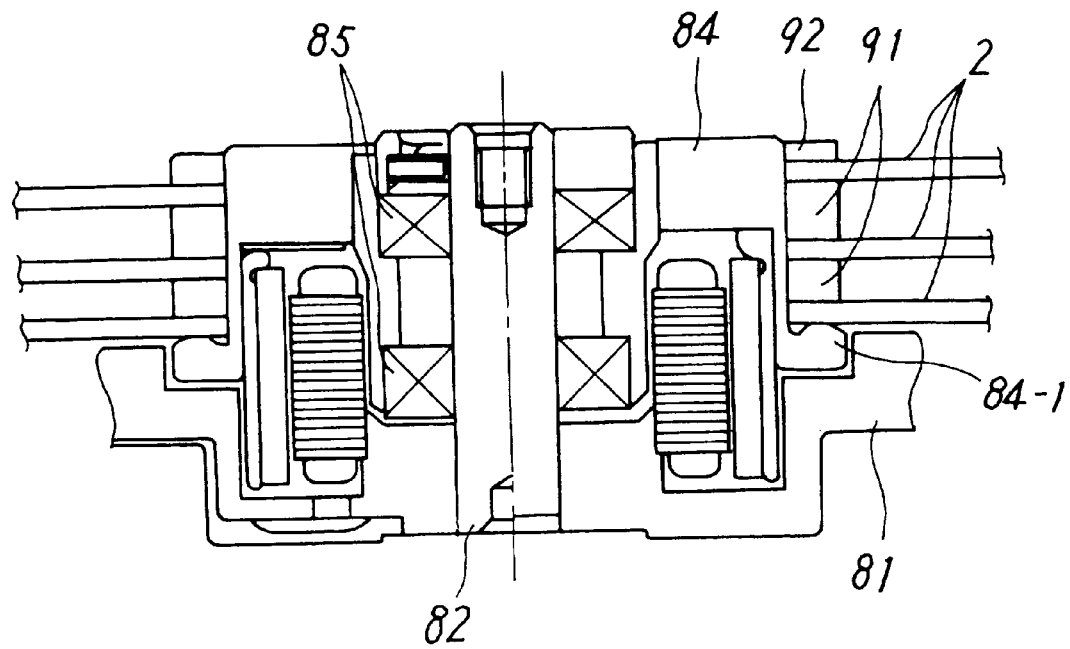

FIG. 13 is an explanatory view showing a further grinding process in a fifth embodiment of the present invention.

Referring to FIG. 13, the same components as those shown in FIGS. 5 and 8A are marked with the like numerals. A second arm 46 is provided with a pressurizing bar 31-2. The pressurizing bar 31-2 pressurizes the disk support surface 12-2 with the aid of a plate spring 45 fitted to the arm 46.

A first displacement sensor 47 is attached to a cutting blade support block 32. Then, the first displacement sensor 47 measures a distance B from the sensor 47 to the disk support surface 12-2. A second displacement sensor 48 is attached to an arm 38. Then, the second displacement sensor 48 measures a distance A from the sensor 48 to a fiducial surface of the base 20.

A control circuit 50 controls a feed quantity of a cutting blade feed motor 34 so that a value obtained by subtracting the distance A detected by the second displacement sensor 48 from the distance B detected by the first displacement sensor 47 becomes fixed.

The control circuit 50 controls the cutting blade feed motor 34 while measuring the distance A between the disk support surface 12-2 and the fiducial surface of the base 20, and therefore a height of the disk support surface 12-2 from the fiducial surface of the base 20 can be made precise.

In addition to the embodiments discussed above, the present invention can be modified as follows:

(1) The embodiments discussed above have dealt with the pressurizing methods using the feeding motor and the spring, but other known methods can be also applied.

(2) The disk storage device has been explained by way of the magnetic disk apparatus, however, an optical disk apparatus and a magneto-optic disk apparatus are also applicable.

The present invention has been described so far by way of the embodiments but can be modified in many forms within the range of the gist of the present invention, and those modifications are not excluded from the scope of the present invention.

As discussed above, the present invention exhibits effects which follow.

In the grinding process, the plurality of pressurizing positions of the support member 12-1 of the hub are prepared, and therefore the disk support surface can be ground flat even by use of the fluid bearing 11 having a small rigidity as the bearing of the hub 12. For this reason, the disk medium can be supported flat even by using the fluid bearing with a less amount of rotational shaking as the bearing of the hub 12.

Accordingly, it is feasible to prevent the rotational shaking of the disk storage medium and enhance the positional accuracy of the disk storage medium.

What is claimed is:

1. A method of manufacturing a spindle motor for disk storage device that includes a hub having a support member for supporting a disk storage medium and a magnet, and a fixed member, having a coil, for supporting said hub in a rotatable manner, said method comprising:

a step of securing said hub to said fixed member through a fluid bearing; and a step of grinding a surface of said support member, thereby forming a support surface for supporting the disk storage medium, while rotating said hub, wherein said grinding step is a step of applying a grinding member to a part of said support member and also pressuring an other part of said support member with a pressurizing member so as to prevent tilting of said hub due to the pressurization by said grinding member.

2. The method of manufacturing the spindle motor for the disk storage device according to claim 1, wherein said grinding step is a step of applying a grinding member to a part of said support member and also pressuring said other part of the support surface of said support member with a pressurizing member so as to prevent tilting of said hub due to the pressurization by said grinding member.

3. The method of manufacturing the spindle motor for the disk storage device according to claim 2, wherein said grinding step is a step of applying a grinding member to a part of the support surface of said support member and also pressuring other parts of the support surface of said support member with a plurality of pressurizing members so as to prevent tilting of said hub due to the pressurization by said grinding member.

4. The method of manufacturing the spindle motor for the disk storage device according to claim 2, wherein said grinding step is a step of applying a grinding member to a part of the support surface of said support member and also pressuring other part of the support surface of said support member with other pressurizing member.

5. The method of manufacturing the spindle motor for the disk storage device according to claim 1, wherein said grinding step is a step of applying a grinding member to a part of the support surface of said support member and also pressurizing a surface opposite to the support surface with a pressurizing member in a position where said grinding member is applied to said support member so as to prevent tilting of said hub due to the pressurization of said grinding member.

6. The method of manufacturing the spindle motor for the disk storage device according to claim 1, wherein said securing step comprises:

a step of securing a fixed shaft to a base of said disk storage device; and a step of attaching said hub to said fixed shaft through said fluid bearing.

7. The method of manufacturing the spindle motor for the disk storage device according to claim 6, wherein said grinding step is a step of controlling a grinding quantity of said grinding member while measuring a position of a grinding surface of said support member and a position of said base.

8. The method of manufacturing the spindle motor for the disk storage device according to claim 1, wherein said grinding step is a step of applying a grinding member to a part of the support surface of said support member and also pressurizing other part of said support member with a rolling member.

9. The method of manufacturing the spindle motor for the disk storage device according to claim 1, wherein said grinding step is a step of applying a grinding member to a part of the support surface of said support member and also pressurizing other part of said support member with a gas or a fluid.

* * * * *